United States Patent [19]

Eisele

[11] Patent Number: 5,317,597
[45] Date of Patent: May 31, 1994

[54] RESISTANCE COUPLED DATA TRANSMISSION ARRANGEMENT

[75] Inventor: Harald Eisele, Pinneberg, Fed. Rep. of Germany

[73] Assignee: U.S. Philips Corporation, New York, N.Y.

[21] Appl. No.: 27,543

[22] Filed: Mar. 5, 1993

Related U.S. Application Data

[63] Continuation of Ser. No. 842,781, Feb. 26, 1992, abandoned, which is a continuation of Ser. No. 566,728, Aug. 13, 1990, abandoned.

[30] Foreign Application Priority Data

Aug. 16, 1989 [DE] Fed. Rep. of Germany ....... 3926885

[51] Int. Cl.$^5$ ............................................... H04B 3/54
[52] U.S. Cl. ...................................................... 375/36
[58] Field of Search .................. 375/17, 36, 76, 7; 370/24; 178/63 F; 307/260, 262–263; 333/261

[56] References Cited

U.S. PATENT DOCUMENTS

| | | | |
|---|---|---|---|
| 3,825,682 | 7/1974 | Phillips | 333/27 |
| 4,280,221 | 7/1981 | Chun et al. | 375/17 |
| 4,569,059 | 2/1986 | Fish | 375/36 |
| 4,573,168 | 2/1986 | Henze et al. | 375/36 |
| 5,050,187 | 9/1991 | Ichie | 375/36 |

FOREIGN PATENT DOCUMENTS 2443770  8/1980  France ........................ 375/36

Primary Examiner—Stephen Chin
Assistant Examiner—Young Tse
Attorney, Agent, or Firm—David R. Treacy

[57] ABSTRACT

A data transmission arrangement powered by at least a supply voltage source ($U_B$), includes a transmitter (11), a receiver (13) and a data transmission path (12) operated in the differential mode and terminated by its characteristic impedance. A reliable detection is possible even upon rupture of one of the two transmission wires (18, 21) by the use of a pure resistance network including the resistors (17, 20) of the transmitter (11), of the data transmission path (12) having the resistors (22, 23) and the resistors (28, 29, 30, 31) of the receiver (13), at least each time one matching resistor (24, 26) being provided on the receiver side connected each to a transmission wire (18, 21) of the data transmission path (12) for producing opposite levels ($U_3$, $U_4$) in the receiver (13) and for producing an absolute level in the case of disturbance of a transmission wire (18 or 21).

16 Claims, 1 Drawing Sheet

RESISTANCE COUPLED DATA TRANSMISSION ARRANGEMENT

This is a continuation of application Ser. No. 07/842,781 filed Feb. 26, 1992 now abandoned, which is a continuation of Ser. No. 07/566,728, filed Aug. 13, 1990, now abandoned.

BACKGROUND OF THE INVENTION

1. Field of the Invention

The invention relates to a data transmission arrangement comprising at least a supply voltage source, a transmitter, a receiver and a two-wire data transmission path operated in the differential mode and terminated by its characteristic impedance.

2. Description of the Related Art

Data transmission arrangements are known. They generally serve to transmit digital data, for example within an electronic data processing system. A transmitter supplies the signal to be transmitted to a data transmission path, which is in turn connected to a receiver.

In a very simple version, the transmission path may consist of only one transmission wire and the receiver may consist of a comparator with a fixed reference level, for example at its positive input. The transmission wire is connected in the receiver to the negative input of the comparator. Such a data transmission arrangement is jeopardized, however, by inductive couplings and can be protected therefrom only by a complicated screening. In the case of differences of the supply voltages in the transmitter and in the receiver, problems also occur.

Therefore, more complicated transmission arrangements have two transmission wires and evaluate the voltage difference thereof through a comparator in the receiver. However, these arrangements have the disadvantage that they supply a reception signal only when both transmission wires are coupled. This means that a reception signal can no longer be obtained in the case of disturbance, for example, due to the rupture of a transmission wire. In order to avoid this disadvantage, it is known to provide two additional blocking capacitors. As a result, the reference potentials are separated and only alternating voltage signals, rather than any arbitrary signals, can be transmitted because of the frequency coupling. For this reason, in such arrangements the admissible duration of the same bit state is determined by the duration of charge or discharge of the capacitors, as a result of which only certain data transmission protocols are usable. Although this arrangement already guarantees an automatic level adjustment in the case of a disturbance of a transmission wire, its disadvantages are predominant, however.

A further arrangement is known, in which no capacitors, but analogous blocking switches are used. In this arrangement, an automatic level adjustment in the case of disturbance of a transmission wire is not possible. Therefore, the switches are switched by means of a data processing system and of a corresponding check program. This technique delays the data transmission and moreover provides a complicated design of the data transmission arrangement.

The known arrangements therefore either do not permit a single wire operation or are limited to applications with given data transmission protocols, or cause great delay upon, disturbance such as loss of connection of a transmission wire.

SUMMARY OF THE INVENTION

The invention has for its object to provide a data transmission arrangement of the kind mentioned in the opening paragraph, which has a simple construction, automatically guarantees a correct decoding of the signal to be transmitted even in the case of disturbance of a transmission wire, and is suitable for data rates up to 1 Mbit/s.

According to the invention, this object is achieved in that the receiver is coupled to the transmitter through a pure resistance network formed by portions of the transmitter, receiver and transmission path. These portions include; resistors of the transmitter, the transmission path and the receiver. In the receiver at least one matching resistor is connected to each transmission wire of the transmission path for producing opposite levels in the receiver so that the resistance network produces an absolute level in the case of loss of signal from one transmission wire.

With differential data transmission, the transmitted message is encoded as a voltage difference between two transmission wires. For example, with digital data transmission, a voltage difference of $U_o$ may be interpreted as "zero" and the opposite voltage difference $-U_o$ may be interpreted as "one". The data transmission arrangement according to the invention represents a combined single- and two-wire transmission arrangement for differential serial data transmission and converts the voltage difference existing between the two transmission wires in such a manner that by means of a following comparator of a receiver the signal originating from a transmitter can be recovered again.

In the data transmission arrangement according to the invention, the detection of the transmitted signal is still possible if the receiver is connected, for example due to an interrupted plug contact, to only one of the two transmission wires. According to the invention, this is made possible by use of a pure resistance network and by a special dimensioning of the elements, especially of the resistors. The data transmission arrangement according to the invention is equally suitable for dominant and for recessive levels. Since also with coupling of only one transmission wire or of only one bus lead, messages can be received, the availability of a system provided therewith is considerably enlarged because it can be consequently employed in vehicles, for example in the electronic control of the anti-lock system, etc. or in the field of industrial electronics.

In a preferred embodiment of the invention, it is ensured that for coupling the data into the data transmission path the transmitter has output transistors connected through diodes and resistors to the transmission wire.

Further, it can be ensured that the voltage difference between the transmission wires assumes opposite levels during data transmission; and that the data transmission path is terminated at each of its ends by a terminal resistor with a value equal to the characteristic impedance, as a result of which a high data rate (higher than 1 Mbit/s) is possible even with long transmission wires. According to a preferred embodiment, a receiver matching resistor is connected on its input side to one transmission wire and on its output side to a voltage divider comprising two resistors and the negative input of a comparator. The other receiver matching resistor is connected on its input side to the other transmission wire and on its output side to a further voltage divider comprising two resistors and the positive input of the comparator. The voltage dividers are fed from the supply voltage source, and the comparator supplies the output signal of the receiver.

According to an advantageous embodiment, a matching of the voltage dividers is guaranteed through the matching resistors in such a manner that opposite levels are normally obtained; and in the case of disturbance of a transmission wire, an absolute level, i.e. a fixed comparison level in the receiver, is automatically provided at one of the comparator inputs. The voltage dividers are then constituted on the one hand by the resistors of the transmitter and of the transmission path and on the other hand by the voltage dividers of the receiver.

In this preferred embodiment the transmitter and the data transmission path has a resistance network between the potentials of the supply voltage source. This network consists of a series combination of a first resistor of the transmitter and a parallel combination of the terminal resistors and of the further resistor of the transmitter. The matching resistors of the receiver are connected before or behind the parallel combination of the terminal resistors. This network ensures that with transmission of recessive levels, in the case of non-conducting transistors of the transmitter, approximately half the supply voltage is applied to each transmission wire; and that with dominant levels in the case of conducting transistors the supply voltage is distributed over the transmission wires symmetrically with respect to half the supply voltage. Further, it can be ensured that through the voltage dividers in the receiver the voltages $U_3$ and $U_4$ at the input of the comparator are fixed. In the case of symmetry of the receiver, that is to say that the quotients of each time the product and the sum of the resistances of the two voltage dividers in the receiver correspond to each other and constitute an equivalent resistor $R_{E1}$, an automatic level adjustment is guaranteed in the case of disturbance of a transmission wire if both matching resistors are smaller than or equal to $$R_{E1}((U_{1d}-U_3)/(U_4-U_3+U_K)-1)$$

and the smallest admissible value for the matching resistors is larger than or equal to $$R_{E1}(U_K/(U_4-U_3-U_K))-R_{E2}/2,$$

where $U_{1d}$ is the voltage $U_1$ of a transmission wire in the case of a dominant level, $U_3$ is the voltage at the negative input, $U_4$ is the voltage at the positive input of the comparator of the receiver (with connected and disconnected bus), $U_K$ is the voltage between the comparator inputs and $R_{E2}$ is the quotient of the product and the sum of the terminal resistors of the data transmission path.

BRIEF DESCRIPTION OF THE DRAWING

An embodiment of the invention will now be described more fully with reference to the accompanying drawing, in which.

DETAILED DESCRIPTION OF THE PREFERRED EMBODIMENT

Figure 1:
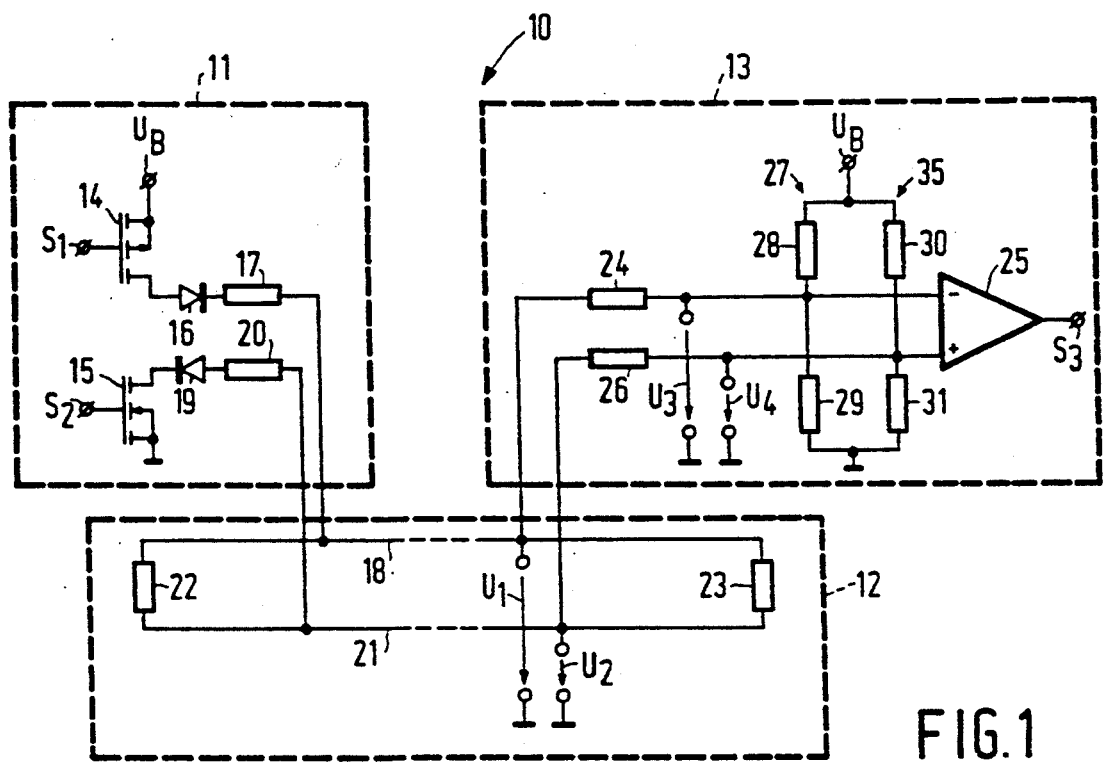
FIG. 1 shows a data transmission arrangement according to the invention.

FIG. 1 shows a direct-current coupled data transmission arrangement 10 consisting of a transmitter 11, a transmission path 12 and a receiver 13. The transmitter 11 has two transistors 14 and 15, to whose gates the opposite signals $S_1$ and $S_2$ to be transmitted are applied. The transistor 14 is connected to the positive terminal of a supply voltage source $U_B$ and further to the anode of a diode 16. The cathode of the diode 16 is connected to a resistor 17, which is in turn connected to a transmission wire (or a bus lead) 18 of the data transmission path 12. The transistor 15 is connected at its source side to earth and at its drain side to the cathode of a diode 19, which is connected on the anode side via a resistor 20 to a further transmission wire 21 of the data transmission path 12. The transistors 14, 15 are preferably MOSFET transistors, the transistor 14 being a p-channel transistor and the transistor 15 being an n-channel transistor. However, bipolar transistors may also be used.

The transmission wires 18 and 21 of the data transmission path 12 have at their ends terminal resistors 22 and 23. The amount of the resistance value of the terminal resistors 22 and 23 preferably corresponds to the characteristic impedance of the transmission wires 18 and 21. The transmission wire 18 is connected through a matching resistor 24 to the negative terminal of a comparator 25 of the receiver 13. The transmission wire 21 is connected through a matching resistor 26 to the positive input of the comparator 25, at whose output the detected signal $S_3$ is available. The voltage of the transmission wire 18 with respect to earth is designated by $U_1$ and that of the transmission wire 21 is designated by $U_2$.

The receiver 13 further comprises two voltage dividers 27 and 35, which are fed from the supply voltage source $U_B$. The voltage divider 27 has two resistors 28 and 29, whose divided voltage $U_3$ is applied to the negative terminal of the comparator 25. The voltage divider 35 has two resistors 30 and 31, whose divided voltage $U_4$ is applied to the positive terminal of the comparator 25.

Opposite to these voltage dividers 27 and 35 of the receiver are arranged voltage dividers comprising the resistors of the transmitter 11 and of the data transmission path 12. They can be matched to each other according to the invention through the matching resistors 24 and 26 of the receiver 13 in such a manner that, in the case of disturbance of one of the transmission wires 18 and 21, respectively, the differential data transmission by means of voltage differences is automatically converted into a single-wire transmission arrangement and a fixed reference level (absolute level) is available at the comparator 25. Reception is therefore also possible when only one transmission wire 18 or 21 is coupled to the receiver 13. Since the transmission path 12 is terminated by terminating resistors 22 and 23 equal to its characteristic impedance, a data rate of a few Mbit/s is advantageously possible even if the transmission wires 18 and 21 are long as compared with the wavelength of the transmitted signal.

Selection of values for the data transmission arrangement according to the invention shown in FIG. 1 can be made in the following manner. With given values for the supply voltage $U_B$, for the resistors 17, 20, 22 and 23 of the transmitter 11 and of the transmission path 12 as well as for the resistors 28, 29, 30 and 31 of the receiver 13, the matching resistors 24 and 26 are selected such that the requirement of single-wire transmission is satisfied. With passive transmitters, i.e. with non-conducting transistors and a recessive signal, the voltages $U_1$ and $U_2$ of the transmission wires 18 and 21 approximately correspond each time to half the supply voltage $U_B$. With active transmitters, i.e. with conducting transistors 14 and 15 and dominant signals, the supply voltage is distributed symmetrically with respect to half the supply voltage over the voltages $U_1$ and $U_2$ of the transmission wires 18 and 21. The difference signal $U_4 - U_3$ minimally required at the input of the comparator 25 of the receiver 13 is equal to $U_K$. With the auxiliary quantities $U_3 = U_B(R_{29}/(R_{28} + R_{29}))$ and $U_4 = U_B(R_{31}/(R_{30} + R_{31}))$ with $U_4$ larger than $U_3$ and the equivalent resistor $R_{E1} = R_{28}R_{29}/(R_{28} + R_{29}) = R_{30}R_{31}/(R_{30} + R_{31})$, the requirement with respect to single-wire reception is satisfied if $R_{24} = R_{26} = R_{E1}((U_{1d} - U_3)/(U_4 - U_3 + U_K) - 1)$. The smallest admissible value for the matching resistors 24 and 26 is obtained if $R_{24} = R_{26} \geq R_{E1} (U_K/(U_4 - U_3 - U_K) - R_{E2}/2$. With $R_{E2} = R_{23}R_{22}/(R_{23} + R_{22})$.

Due to the fact that this dimensioning prescription is maintained, a matching in accordance with the invention of the resistance networks of the transmitter 11 and of the transmission path 12 to that of the receiver 13 is guaranteed. In case the aforementioned relations are in contrast with each other, it may be required to reduce the resistors 17 and 20 or to increase the terminal resistors 22 and 23 and to increase the supply voltage $U_B$; or to match again the resistors 28, 29, 30 and 31, in such a way, that, with a disconnected bus, $U_4$ is equal to $U_3$, or to choose a comparator 25 with a higher sensitivity.

Figure 2:
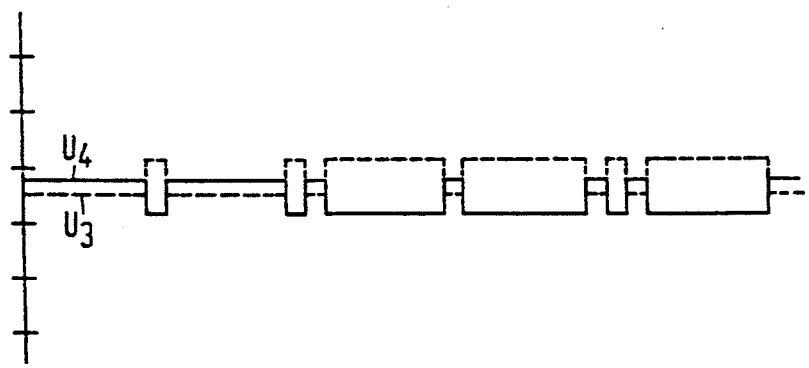
FIG. 2 shows the level input of a comparator of a receiver in case the data transmission path is not disturbed.

FIG. 2 shows the opposite variations of the levels of the voltages $U_3$ and $U_4$ in the receiver 13, which in the case of an undisturbed transmission path 12 are supplied for detection to the comparator 25.

Figure 3:
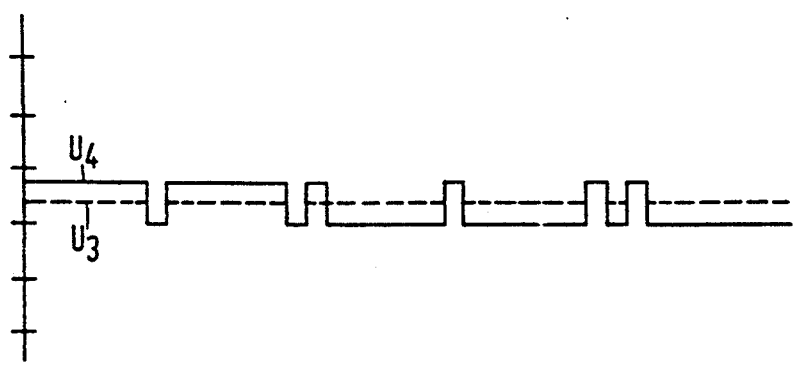
FIG. 3 shows the levels at the input of the comparator of the receiver in case the data transmission path is disturbed.

FIG. 3 shows the variation of the voltages $U_3$ and $U_4$ in the case of disturbance of the transmission wire 18 of the transmission path 12. Also this signal can be correctly detected in the same manner by the comparator 25 because the voltage level $U_3$ indicated by broken lines is now available for detection as an absolute comparison level.

According to another embodiment of the invention, depending on the supply voltage $U_B$, the kind of transistors and diodes used in the transmitter output, and the kind of comparator used in the receiver, when transmission at data rates higher than a few mbits/s is desired, the termination resistors have values which deviate from the value of the characteristic impedance of the transmission path.

The features of the invention disclosed in the above description in FIGS. 1, 2 and 3 and in the Claims can be desirable both individually and in arbitrary combinations to the realization of the invention in the different embodiments.

I claim:

1. A data transmission arrangement comprising a two-wire direct-coupled transmission path operated in the differential mode and terminated by terminations having its characteristic impedance; a data signal transmitter comprising output means for connecting to said transmission path; and a receiver comprising input means for connecting to said transmission path, a supply voltage source and a comparator,
    characterized in that portions of said transmission path, output means for connecting, and input means for connecting together form a pure resistance coupling network providing conductive coupling between said transmitter and receiver, and
    said network comprises two transmitter resistors, in said output means for connecting; at least two termination resistors, in the data transmission path terminations; and a plurality of receiver divider resistors and two matching resistors, in said input means for connecting,
    each transmitter resistor being connected to a respective wire of said transmission path, for coupling to said path a signal to be transmitted,
    each matching resistor being connected between a respective wire of said transmission path and a corresponding input of said comparator for producing opposite voltage level differences at the comparator input in response to transmission of a given signal, and
    each said receiver divider resistor being respectively connected between said supply voltage source and one or the other of said corresponding inputs of said comparator for producing an absolute voltage level at the corresponding comparator input in response to loss of signal from one wire in the transmission path.

2. An arrangement as claimed in claim 1, characterized in that said plurality of receiver divider resistors comprised four resistors connected to form first and second resistive voltage dividers; and said comparator has positive and negative inputs respectively connected to said first and second dividers, and an output which is the receiver output,
    one matching resistor of the receiver is connected between one of said transmission wires and said positive input of said comparator,
    one other matching resistor of the receiver is connected between the other of said transmission wires and said negative input of said comparator, and
    each of said voltage dividers is fed from said supply voltage source with reference potentials equal in magnitude to each other.

3. An arrangement as claimed in claim 2, characterized in that said matching resistors are respective resistors $R_{24}$ and $R_{26}$ which satisfy the equations $$R_{24} = R_{26} \leq R_{E1}((U_{1d} - U_3)/(U_4 - U_3 + U_k) - 1) \text{ and}$$

$$R_{24} = R_{26} \geq R_{E1} U_k/(U_4 - U_3 - U_k) - R_{E2}/2,$$

where
$U_3 U_B R_{29}/(R_{28} + R_{29})$,
$U_4 = U_B R_{31}/(R_{30} + R_{31})$,
$U_4 \geq U_3$,
$R_{E1} = R_{28} R_{29}/(R_{28} + R_{29}) = R_{30} R_{31}/(R_{30} + R_{31})$,
$R_{E2} = R_{23} R_{22}/(R_{23} + R_{22})$,
    $U_B$ is the voltage of said supply voltage source,
    $U_k$ is the input voltage of the comparator,
    $U_{1d}$ is the voltage $U_1$ on the transmission wire connected to $R_{24}$, with a dominant signal,
    $R_{22}$ and $R_{23}$ are the resistances of the termination resistors,
    $R_{28}$ and $R_{29}$ are the resistances of the divider resistors to which $R_{24}$ is connected, and $R_{30}$ and $R_{31}$ are the resistances of the divider resistors to which $R_{26}$ is connected, whereby an automatic level adjustment is guaranteed in the event of loss of signal from a transmission wire.

4. An arrangement as claimed in claim 1, characterized in that said termination resistors have values different from said characteristic impedance, and said transmitter resistors and said comparator are selected for transmitting higher data rates than a few Mbit/s.

5. A data transmission arrangement comprising a two-wire direct-coupled transmission path operated in the differential mode and terminated by terminations having its characteristic impedance; a data signal transmitter comprising output means for connecting to said transmission path; and a receiver comprising input means for connecting to said transmission path, a supply voltage source and a comparator, characterized in that said path has two ends; portions of said transmission path, output means for connecting, and input means for connecting together form a pure resistance coupling network providing conductive coupling between said transmitter and receiver, said network comprises two transmitter resistors, in said output means for connecting; at least two termination resistors, in the data transmission path terminations; and a plurality of receiver divider resistors and two matching resistors, in said input means for connecting, each transmitter resistor being connected to a respective wire of said transmission path, for coupling to said path a signal to be transmitted, each matching resistor being connected between a respective wire of said transmission path and a corresponding input of said comparator for producing opposite voltage level differences at the comparator input in response to transmission of a given signal, each termination comprising a respective one said termination resistor, each termination resistor having a value equal to said characteristic impedance, during data transmission, a voltage difference between the transmission wires having opposite levels, and each said receiver divider resistor being respectively connected between said supply voltage source and one or the other of said corresponding inputs of said comparator for producing an absolute voltage level at the corresponding comparator input in response to loss of signal from one wire in the transmission path.

6. An arrangement as claimed in claim 5, characterized in that said plurality of receiver divider resistors comprised four resistors connected to form first and second resistive voltage dividers; and said comparator has positive and negative inputs respectively connected to said first and second dividers, and an output which is the receiver output, one matching resistor of the receiver is connected between one of said transmission wires and said positive input of said comparator, one other matching resistor of the receiver is connected between the other of said transmission wires and said negative input of said comparator, each of said voltage dividers is fed from said supply voltage source with reference potentials equal in magnitude to each other, and said matching resistors are selected to match respective path voltage dividers formed by the respective transmitter resistors, termination resistors, and resistive voltage dividers such that, in the event of loss of signal from one of said transmission wires, an absolute signal level is provided to one of said comparator inputs.

7. An arrangement as claimed in claim 6 wherein said transmitter comprises a transmitter voltage source, characterized in that one of said transmitter resistors, a parallel combination of said termination resistors, and the other transmitter resistor, are connected to form a series circuit connected between potentials of said transmitter voltage source.

8. A data transmission arrangement comprising a two-wire direct-coupled transmission path operated in the differential mode and terminated by terminations having its characteristic impedance; a data signal transmitter comprising output means for connecting to said transmission path; and a receiver comprising input means for connecting to said transmission path, a supply voltage source and a comparator, characterized in that the transmitter comprises two transistors for coupling data signals into the output means for connecting; and said output means comprises at least one diode connected between each said transistor and a corresponding wire of the transmission path to form a series circuit, portions of said transmission path, output means for connecting, and input means for connecting together form a pure resistance coupling network providing conductive coupling between said transmitter and receiver, and said network comprises two transmitter resistors, in said output means for connecting; at least two termination resistors, in the data transmission path terminations; and a plurality of receiver divider resistors and two matching resistors, in said input means for connecting, each transmitter resistor being part of a respective said series circuit, for coupling to said path a signal to be transmitted, each matching resistor being connected between a respective wire of said transmission path and a corresponding input of said comparator for producing opposite voltage level differences at the comparator input in response to transmission of a given signal, and each said receiver divider resistor being respectively connected between said supply voltage source and one or the other of said corresponding inputs of said comparator for producing an absolute voltage level at the corresponding comparator input in response to loss of signal from one wire in the transmission path.

9. An arrangement as claimed in claim 8, characterized in that said path has two ends; each termination comprises a respective one said termination resistor, each termination resistor having a value equal to said characteristic impedance; and, during data transmission, a voltage difference between the transmission wires has opposite levels.

10. An arrangement as claimed in claim 9, characterized in that said plurality of receiver divider resistors comprise four resistors connected to form first and second resistive voltage dividers; and said comparator has positive and negative inputs respectively connected to said first and second dividers, and an output which is the receiver output, one matching resistor of the receiver is connected between one of said transmission wires and said positive input of said comparator, one other matching resistor of the receiver is connected between the other of said transmission wires and said negative input of said comparator, each of said voltage dividers is fed from said supply voltage source with reference potentials equal in magnitude to each other, and said matching resistors are selected to match respective path voltage dividers formed by the respective transmitter resistors, termination resistors, and resistive voltage dividers such that, in the event of loss of signal from one of said transmission wires, an absolute signal level is provided to one of said comparator inputs.

11. An arrangement as claimed in claim 10, wherein said transmitter comprises a transmitter voltage source, characterized in that one of said transmitter resistors, a parallel combination of said termination resistors, and the other transmitter resistor, are connected to form a further series circuit connected between potentials of said transmitter voltage source.

12. An arrangement as claimed in claim 10, characterized in that said transmitter comprises a transmitter voltage source having a given supply voltage $U_B$, in the event that one of said transistors is non-conducting and recessive levels are transmitted, approximately half said given supply voltage $U_B$ is applied to each transmission wire, and during transmission of dominant levels with said transistors being operative, a voltage symmetrical with respect to half said given supply voltage $U_B$ is applied to said transmission wires.

13. An arrangement as claimed in claim 10, characterized in that said matching resistors are respective resistors $R_{24}$ and $R_{26}$ which satisfy the equations $$R_{24} = R_{26} \leq R_{E1}(U_{1d} - U_3)/(U_4 - U_3 + U_K) - 1) \text{ and}$$

$$R_{24} = R_{26} \geq R_{E1} U_K/(U_4 - U_3 - U_K) - R_{E2}/2,$$

where
$U_3 = U_B R_{29}/(R_{28} + R_{29})$,
$U_4 = U_B R_{31}/(R_{30} + R_{31})$,
$U_4 \geq U_3$,
$R_{E1} = R_{28} R_{29}/(R_{28} + R_{29}) = R_{30} R_{31}/(R_{30} + R_{31})$,
$R_{E2} = R_{23} R_{22}/(R_{23} + R_{22})$,
$U_B$ is the voltage of said supply voltage source,
$U_K$ is the input voltage of the comparator,
$U_{1d}$ is the voltage $U_1$ on the transmission wire connected to $R_{24}$, with a dominant signal,
$R_{22}$ and $R_{23}$ are the resistances of the termination resistors,
$R_{28}$ and $R_{29}$ are the resistances of the divider resistors to which $R_{24}$ is connected, and
$R_{30}$ and $R_{31}$ are the resistances of the divider resistors to which $R_{26}$ is connected,
whereby an automatic level adjustment is guaranteed in the event of loss of signal from a transmission wire.

14. An arrangement as claimed in claim 8, characterized in that said plurality of receiver divider resistors comprised four resistors connected to form first and second resistive voltage dividers; and said comparator has positive and negative inputs respectively connected to said first and second dividers, and an output which is the receiver output, one matching resistor of the receiver is connected between one of said transmission wires and said positive input of said comparator, one other matching resistor of the receiver is connected between the other of said transmission wires and said negative input of said comparator, and each of said voltage dividers is fed from said supply voltage source with reference potentials equal in magnitude to each other.

15. An arrangement as claimed in claim 14, characterized in that said matching resistors are respective resistors $R_{24}$ and $R_{26}$ which satisfy the equations $$R_{24} = R_{26} \leq R_{E1}(U_{1d} - U_3)/(U_4 - U_3 + U_k) - 1) \text{ and}$$

$$R_{24} = R_{26} \geq R_{E1} U_k/(U_4 - U_3 - U_k) - R_{E2}/2,$$

where
$U_3 = U_B R_{29}/(R_{28} + R_{29})$,
$U_4 = U_B R_{31}/(R_{30} + R_{31})$,
$U_4 \geq U_3$,
$R_{E1} = R_{28} R_{29}/(R_{28} + R_{29}) = R_{30} R_{31}/(R_{30} + R_{31})$,
$R_{E2} = R_{23} R_{22}/(R_{23} + R_{22})$,
$U_B$ is the voltage of said supply voltage source,
$U_K$ is the input voltage of the comparator,
$U_{1d}$ is the voltage $U_1$ on the transmission wire connected to $R_{24}$, with a dominant signal,
$R_{22}$ and $R_{23}$ are the resistances of the termination resistors,
$R_{28}$ and $R_{29}$ are the resistances of the divider resistors to which $R_{24}$ is connected, and
$R_{30}$ and $R_{31}$ are the resistances of the divider resistors to which $R_{26}$ is connected,
whereby an automatic level adjustment is guaranteed in the event of loss of signal from a transmission wire.

16. An arrangement as claimed in claim 8, characterized in that said termination resistors have values different from said characteristic impedance, and said transistors, said diodes and said comparator are selected for transmitting higher data rates than a few Mbit/s.

* * * * *